United States Patent [19]

Moriyama et al.

[11] Patent Number: 5,338,502
[45] Date of Patent: Aug. 16, 1994

[54] PROCESS FOR PREPARING MOLDED ARTICLES OF HYDROLYZED ETHYLENE-VINYL ACETATE COPOLYMERS

[75] Inventors: Takamasa Moriyama; Hiroki Masumoto, both of Takatsuki; Kuniyasu Kato, Joyo, all of Japan

[73] Assignee: Nippon Gohsei Kagaku Kogyo Kabushiki Kaisha, Osaka, Japan

[21] Appl. No.: 902,162

[22] Filed: Jun. 22, 1992

[30] Foreign Application Priority Data

Jun. 24, 1991 [JP] Japan ................................. 3-151788

[51] Int. Cl.$^5$ ............................................. B29C 51/02
[52] U.S. Cl. .................................. 264/322; 264/349; 264/544; 525/57; 525/197
[58] Field of Search ............... 525/57, 197; 264/349, 264/322, 544

[56] References Cited

U.S. PATENT DOCUMENTS

| | | | |
|---|---|---|---|
| 3,342,901 | 9/1967 | Kosinsky et al. | 525/197 |
| 3,975,463 | 8/1976 | Hirata et al. | 525/57 |
| 4,547,541 | 10/1985 | Golba, Jr. | 525/197 |

FOREIGN PATENT DOCUMENTS

| | | | |
|---|---|---|---|
| 157655 | 10/1985 | European Pat. Off. | 525/57 |
| 0342066 | 11/1989 | European Pat. Off. | |
| 0440559A2 | 8/1991 | European Pat. Off. | |
| 0483696A2 | 5/1992 | European Pat. Off. | |
| 49-35335 | 9/1974 | Japan | 525/222 |
| 54-149753 | 11/1979 | Japan | 525/57 |
| 60-161447 | 8/1985 | Japan | 525/57 |
| 63-175051 | 7/1988 | Japan | 525/57 |
| 63-175052 | 7/1988 | Japan | 525/57 |
| 2274744 | 11/1990 | Japan | 525/57 |
| WO 89/08548 | 9/1989 | PCT Int'l Appl. | |
| WO 90/15101 | 12/1990 | PCT Int'l Appl. | |

*Primary Examiner*—Catherine Timm
*Attorney, Agent, or Firm*—Nikaido, Marmelstein, Murray & Oram

[57] ABSTRACT

A process for preparing a molded article of a hydrolyzed ethylene-vinyl acetate copolymer which includes separately melting each of a hydrolyzed ethylene-vinyl acetate copolymer and a polyolefin, admixing the melted copolymer with the melted polyolefin in a weight ratio of the hydrolyzed ethylene-vinyl acetate copolymer to the polyolefin of 30/70 to 70/30 and molding the mixture, according to which the molded article having improved flex-crack resistance, stretchability and thermoformability can be obtained with minimized deterioration of gas-impermeability.

6 Claims, No Drawings

PROCESS FOR PREPARING MOLDED ARTICLES OF HYDROLYZED ETHYLENE-VINYL ACETATE COPOLYMERS

BACKGROUND OF THE INVENTION

The present invention relates to a process for preparing a molded article of a hydrolyzed ethylene-vinyl acetate copolymer (hereinafter referred to as "EVOH"), and more particularly to a process for preparing EVOH molded articles having a good gas-impermeability and superior in flex-crack resistance, stretchability and thermoformability.

EVOH has an excellent gas-impermeability. When EVOH molded in the form of film or sheet is subjected to thermoforming, e.g. vacuum forming, a good thermoformability and a sufficient elongation or stretchability are required. In case of imparting flex-crack resistance, stretchability and thermoformability to EVOH molded articles, there has hitherto been adopted a method wherein EVOH is blended with a polyolefin.

However, for providing EVOH molded articles with a flex-crack resistance satisfactory for practical use, it is necessary to blend EVOH with a large quantity of a polyolefin. Generally the melting point of EVOH is higher than that of a polyolefin. Therefore, in case that a large amount of a polyolefin is added to EVOH at once and the blend is molded, the polyolefin which has a lower melting point melts prior to EVOH, so matrix formation of EVOH is made unstable, thus resulting in deterioration of gas-impermeability.

Recently, in order to solve the above problem encountered in blending EVOH with a polyolefin, it is proposed to use an acid-modified polyolefin or the like as a compatibilizer. This proposal surely improves the gas-impermeability to some degree, but the improvement is only on a low level. Moreover, the obtained EVOH films or sheets are insufficient in flex-crack resistance and stretchability.

An object of the present invention is to provide a process for preparing a molded article of EVOH having an improved flex-crack resistance without deteriorating the gas-impermeability.

A further object of the present invention is to provide a film or sheet-like molded article of EVOH having an excellent gas-impermeability and having improved flex-crack resistance, enlongation or stretchability and thermoformability.

These and other objects of the present invention will become apparent from the description hereinafter.

SUMMARY OF THE INVENTION

It has been found that when each of EVOH and a polyolefin is previously melted separately, and they are then admixed in a predetermined blending ratio and molded into a desired shape, the flex-crack resistance, stretchability and thermoformability are improved, and deterioration of gas-impermeability is minimized.

In accordance with the present invention, there is provided a process for preparing a molded article of a hydrolyzed ethylene-vinyl acetate copolymer which comprises separately melting each of a hydrolyzed ethylene-vinyl acetate copolymer and a polyolefin, mixing the melted copolymer with the melted polyolefin in a weight ratio of the hydrolyzed ethylene-vinyl acetate copolymer to the polyolefin of 30/70 to 70/30, and molding the mixture.

When a hydrolyzed ethylene-vinyl acetate copolymer (EVOH) is simply blended with a polyolefin and the blend is melted as practiced in conventional processes, it is difficult to stably form a matrix of EVOH. In contrast, when EVOH and a polyolefin are separately melted and then admixed according to the process of the present invention, a matrix of EVOH necessary to obtain a high gas-impermeability can be stably formed even within the above-mentioned range of the mixing ratio.

The process of the present invention is particularly useful in case that a difference in melting point between EVOH and a polyolefin is not less than 10° C.

Further, in the present invention, more stable EVOH matrix formation is achieved by previously incorporating a compatibilizer in the melted polyolefin. The presence of the compatibilizer is also desirable in forming a fine dispersed phase of the polyolefin and also stably retaining the formed fine dispersed phase in the EVOH matrix.

DETAILED DESCRIPTION

As the EVOH used in the present invention, there are used, for instance, hydrolyzed ethylene-vinyl acetate copolymers having an ethylene content of 20 to 60 % by mole, preferably 25 to 50% by mole, a melt index of 1 to 100 g/10 minutes, preferably 3 to 0 g/10 minutes (measured at 210° C. under a load of 2,160 g), and a degree of hydrolysis in the vinyl acetate units of at least 90 % by mole, preferably at least 99% by mole.

When the ethylene content is less than 20% by mole, molding is difficult because the molding temperature comes near to the decomposition temperature. On the other hand, when the ethylene content is more than 60% by mole, the gas-impermeability tends to deteriorate. When the melt index is less than 1 g/10 minutes, processing is difficult because the inside of an extruder cylinder becomes in a high torque condition at the time of processing. On the other hand, when the melt index is more than 100 g/10 minutes, extrusion processability is unstable due to low torque. Also, when the degree of hydrolysis is less than 90% by mole, gas-impermeability is deteriorated.

The EVOH used in the present invention may contain a small amount of a comonomer as a modifying component, e.g. unsaturated carboxylic acids and their anhydrides, salts and esters, α-olefins, vinyl ethers, nitriles, amides and other comonomers conventionally used. The content of the comonomer is usually at most 30% by mole.

Examples of the polyolefin used in the present invention are, for instance, polyolefins such as a very low density polyethylene, a low density polyethylene, a high density polyethylene and a polypropylene, and copolymers mainly composed of an olefin such as an ethylene-vinyl acetate copolymer and an ethylene-ethyl acrylate copolymer which have a high ethylene content, and the like. The polyolefins used in the present invention are not limited to them, and other olefin resins used conventionally for the same purposes can be used in the present invention.

It is desirable in achieving the objects of the present invention to select the EVOH and polyolefin so that the difference in melting point between them is not less than 10° C.

Further, it is preferable to select the EVOH and polyolefin and the temperatures at which they are melted separately by an extruder prior to mixing the melted resins so that the ratio of the melt index of the EVOH to the melt index of the polyolefin at each extrusion temperature is 0.01 to 100, preferably 0.1 to 10.

Each of the EVOH and the polyolefin is separately melted with heating. The temperatures for melting are not particularly limited. Usually, the EVOH is melted at a temperature of 180° to 240° C., and the polyolefin is melted at a temperature of 150° to 250° C.

The melted EVOH and the melted polyolefin can be mixed, for instance, by first melting the EVOH in a twin screw extruder, successively supplying the melted polyolefin from a side feeding port of the twin screw extruder, and kneading both in the extruder to form a uniform composition. However, the method for mixing the melted resins is not limited to this method.

The EVOH is blended with the polyolefin in a weight ratio of EVOH/polyolefin of 30/70 to 70/30, preferably 40/60 to 60/40. When the mixing ratio is less than 30/70 by weight, effects of improving flex-crack resistance, stretchability and thermoformability are insufficient. On the other hand, when the mixing ratio is more than 70/30 by weight, molded articles having stable physical properties are not obtained because a matrix of EVOH is not stably formed and inversion of matrix is apt to occur.

A compatibilizer may be used in the present invention. Examples of the compatibilizer are, for instance, polyolefins modified with acids such as unsaturated carboxylic acids, typically so-called adhesive polyolefins, e.g. acid-modified polyolefins obtained by grafting maleic anhydride onto polyolefins, and polyamide-grafted polyolefins obtained by reacting the acid-modified polyolefins with polyamides such as nylon. The compatibilizers are not limited to these exemplified agents, and other compatibilizer which improve the compatibility between the EVOH and the polyolefin can be used in the present invention. The compatibilizer is usually added to the polyolefin to be blended with EVOH and is melted together prior to blending with the EVOH.

The amount of the compatibilizer is at most 100 parts by weight, preferably 10 to 60 parts by weight, per 100 parts by weight of the polyolefin to be blended with the EVOH. When the amount of the compatibilizer is more than 100 parts by weight, it may cause gelation during processing because the melted mixture becomes thermally unstable.

After mixing the melted EVOH and the melted polyolefin to give a uniform composition, the mixture is then molded into a desired shape such as pellets, films or sheets in a usual manner, for instance, by means of an extruder or other suitable means.

The molded articles obtained according to the process of the present invention are in the state of a so-called polymer alloy of EVOH and polyolefin. The molded articles of the present invention show excellent flex-crack resistance, stretchability and thermoformability, which have not been achieved by conventional techniques, and moreover have an excellent gas-impermeability. Therefore, the molded articles of the present invention can be suitably employed for various purposes, e.g. a container having an excellent impact resistance, a bag-in-box having an excellent flex-crack resistance, a shrinkable film and a deep drawing container. The film or sheet-like molded articles according to the present invention can be further processed by thermoforming such as vacuum molding because of having an excellent thermoformability and an excellent stretchability.

The present invention is more specifically described and explained by means of the following Examples and Comparative Examples in which all parts are by weight unless otherwise noted. It is to be understood that the present invention is not limited to the Examples.

EXAMPLE 1

To a twin screw extruder was supplied a hydrolyzed ethylene-vinyl acetate copolymer having an ethylene content of 32% by mole, a melt index of 3 g/10 min. (measured at 210° C. under a load of 2,160 g) and a degree of hydrolysis of not less than 99.5% by mole, and the copolymer was melted at 230° C. A mixture of 25 parts of a very low density polyethylene modified with 30,000 ppm of maleic anhydride and 75 parts of a very low density polyethylene having a melt index of 0.8 g/10 min. (measured at 190° C. under a load of 2,160 g) and a density of 0.905 $g/cm^3$ was melted at 230° C. in a single screw extruder. The melted mixture was supplied from a side feeding port of the above-mentioned twin screw extruder in such an mount that the ratio of the hydrolyzed ethylene-vinyl acetate copolymer to the polyolefin mixture was 60/40 by weight. The both polymers were then kneaded uniformly by the twin screw extruder.

The thus obtained blend was extruded through a die at 220° C. to give a film having a thickness of 30 μm.

The physical properties of the obtained film were measured with respect to film processability, film appearance, oxygen permeability, flex-crack resistance and impact resistance according to the following methods.

The results are shown in Table 1.

(a) Film processability

Presence of gel, surging, occurrence of external die buildup were visually observed. Also, buildup on the screw and internal die buildup were observed after the film processing.

(b) Film appearance

The obtained film was visually observed with respect to the presence of striation. Also, anisotropy of tear was observed by tearing the film.

(c) Oxygen permeability

Oxygen permeability of the film was measured at 20° C. and 75% RH (relative humidity) by using an oxygen permeability measurement device (OX-TRAN 10-50 made by Modern Controls Inc. ).

(d) Flex-crack resistance

The film (12 inches×8 inches) was made round to give a cylinder having a diameter of 3.5 inches. The cylinder was attached to a flex tester (Gelbo flex tester made by Rigaku Kogyo Kabushiki Kaisha) by gripping the both ends. A reciprocating motion wherein the initial grip spacing was 7 inches, the grip spacing at the maximum flexing was 1 inch, a twist at an angle of 440° was applied at first 3.5 inches of a stroke and a linear horizontal motion was executed in the following 2.5 inches, was repeated at a rate of 40 times/minute 300 times at 20° C. and 0% RH, or 100 times at 5° C. and 0% RH. The number of pin holes in the film was counted.

(e) Impact resistance

The impact resistance of the film having a thickness of 30 μm was measured at 20° C. and 65% RH by a film impact tester made by Rigaku Kogyo Kabushiki Kaisha using a steel hammerhead having a diameter of 38 mm.

EXAMPLE 2

A film was prepared in the same manner as in Example 1 except that the weight ratio of the hydrolyzed ethylene-vinyl acetate copolymer to the polyolefin mixture was 40/60.

The physical properties of the obtained film were measured in the same manner as in Example 1.

The results are shown in Table 1.

EXAMPLE 3

The procedure of Example 1 was repeated except that the weight ratio of the hydrolyzed ethylene-vinyl acetate copolymer to the polyolefin mixture was 50/50.

The physical properties of the obtained film were measured in the same manner as in Example 1.

hydrolysis of not less than 99.5% by mole were mixed by dry blending in a copolymer/polyolefin mixture ratio of 60/40 by weight. The resulting dry blend was supplied to a twin screw extruder at once, and melted and uniformly kneaded in the twin screw extruder.

The obtained blend was extruded through a die at 220° C. to give a film having a thickness of 30 μm.

The physical properties of the obtained film were measured in the same manner as in Example 1.

The results are shown in Table 1.

COMPARATIVE EXAMPLE 2

The procedure of Example 1 was repeated except that the polyolefin mixture was not used to give a film having a thickness of 30 μm.

The physical properties of the obtained film were measured in the same manner as in Example 1.

The results are shown in Table 1.

In addition to the ingredients used in the Examples, other ingredients can be used in the Examples as set forth in the specification to obtain substantially the same results.

TABLE 1

| | Film processability | Film appearance | Oxygen permeability (cc. 20 μm/m² · day · atm) | Flex-crack resistance (The number of pin holes) | | Impact resistance 20° C. × 65% RH (Kg · cm) |
| --- | --- | --- | --- | --- | --- | --- |
| | | | | 20° C., 0% RH, 300 times | 5° C., 0% RH, 100 times | |
| Ex. 1 | good | good | 2.8 | 0 | 0 | 18.1 |
| Ex. 2 | good | good | 3.5 | 0 | 0 | 19.2 |
| Ex. 3 | good | good | 3.0 | 0 | 0 | 18.5 |
| Ex. 4 | good | good | 6.5 | 0 | 0 | 19.4 |
| Ex. 5 | good | good | 2.3 | 0 | 0 | 18.0 |
| Com. Ex. 1 | bad | rough | >500 | 120 | >200 | 5.4 |
| Com. Ex. 2 | bad | rough | >500 | 110 | >200 | 4.5 |

The results are shown in Table 1.

EXAMPLE 4

The procedure of Example 1 was repeated except that a hydrolyzed ethylene-vinyl acetate copolymer having an ethylene content of 44% by mole, a melt index of 12 g/10 min. (measured at 210° C. under a load of 2,160 g) and a degree of hydrolysis of not less than 99.5% by mole was used.

The physical properties of the obtained film were measured in the same manner as in Example 1.

The results are shown in Table 1.

EXAMPLE 5

The procedure of Example 2 was repeated except that a hydrolyzed ethylene-vinyl acetate copolymer having an ethylene content of 28% by mole, a melt index of 3 g/10 min. (measured at 210° C. under a load of 2,160 g) and a degree of hydrolysis of not less than 99.5% by mole was used.

The physical properties of the obtained film were measured in the same manner as in Example 1.

The results are shown in Table 1.

COMPARATIVE EXAMPLE 1

There were mixed 25 parts of a very low density polyethylene modified with 30,000 ppm of maleic anhydride and 75 parts of a very low density polyethylene having a melt index of 0.8 g/10 min. (measured at 190° C. under a load of 2,160 g) and a density of 0.905 g/cm³. The obtained polyolefin mixture and a hydrolyzed ethylene-vinyl acetate copolymer having an ethylene content of 32% by mole, a melt index of 3 g/10 min. (measured at 210° C. under a load of 2,160 g) and a degree of

What is claimed is:

1. A process for preparing a molded article with low gas permeability and superior flex-crack resistance, stretchability and thermoformability comprising the steps of:
   separately melting a hydrolyzed ethylene-vinyl acetate copolymer and a polyolefin,
   mixing the melted copolymer with the melted polyolefin in a weight ratio of hydrolyzed ethylene-vinyl acetate copolymer to polyolefin of 30/70 to 70/30 to form a mixture, and
   molding the mixture to form a molded article composed of a polymer alloy of hydrolyzed ethylene-vinyl acetate copolymer and polyolefin, wherein the polyolefin is finely dispersed in a matrix of the hydrolyzed ethylene-vinyl acetate copolymer.

2. The process according to claim 1, wherein said polyolefin is melted with a compatibilizer.

3. The process according to claim 2, wherein said compatibilizer is selected from the group consisting of polyolefins modified with unsaturated carboxylic acids and polyamide-grafted polyolefins.

4. The process according to claim 2, wherein said compatibilizer is in an amount of less than 100 parts by weight per 100 parts by weight of said polyolefin.

5. The process according to claim 1, wherein the difference in melting point between said hydrolyzed ethylene-vinyl acetate copolymer and said polyolefin is at least 10° C.

6. The process according to claim 1, further comprising thermoforming the mixture to produce a shaped article, wherein the mixture is in the form of a film or sheet.

* * * * *